US007761106B2

(12) United States Patent
Konchitsky

(10) Patent No.: US 7,761,106 B2
(45) **Date of Patent: *Jul. 20, 2010**

(54) VOICE CODER WITH TWO MICROPHONE SYSTEM AND STRATEGIC MICROPHONE PLACEMENT TO DETER OBSTRUCTION FOR A DIGITAL COMMUNICATION DEVICE

(76) Inventor: Alon Konchitsky, 20488 Stevens Creek Blvd., Apt. 1402, Cupertino, CA (US) 95014

(*) Notice: Subject to any disclaimer, the term of this patent is extended or adjusted under 35 U.S.C. 154(b) by 608 days.

This patent is subject to a terminal disclaimer.

(21) Appl. No.: 11/695,478

(22) Filed: Apr. 2, 2007

(65) Prior Publication Data

US 2008/0013749 A1 Jan. 17, 2008

Related U.S. Application Data

(60) Provisional application No. 60/747,022, filed on May 11, 2006.

(51) Int. Cl.
*H04B 7/01* (2006.01)

(52) U.S. Cl. ................. 455/501; 455/569.12; 455/41.2; 455/556.1; 455/114.2; 455/570

(58) Field of Classification Search ................ 455/41.2, 455/41.1, 41.3, 3.06, 420, 425, 502, 67.16, 455/90.1, 556.1, 569.1, 114.2, 570; 318/326, 318/361, 151, 74
See application file for complete search history.

(56) References Cited

U.S. PATENT DOCUMENTS 5,969,838 A * 10/1999 Paritsky et al. .............. 398/136
6,415,034 B1 * 7/2002 Hietanen .................. 381/71.6
2003/0210203 A1 * 11/2003 Phillips et al. .............. 343/850
2005/0058280 A1 * 3/2005 Ma ............................ 379/430
2007/0021958 A1 * 1/2007 Visser et al. ................ 704/226
2007/0038442 A1 * 2/2007 Visser et al. ................ 704/233
2007/0237339 A1 * 10/2007 Konchitsky .................. 381/91
2007/0274552 A1 * 11/2007 Konchitsky et al. ......... 381/328
2008/0004904 A1 * 1/2008 Tran .............................. 705/2
2008/0013749 A1 * 1/2008 Konchitsky ................ 381/94.7
2008/0044036 A1 * 2/2008 Konchitsky ................ 381/71.1
2008/0201138 A1 * 8/2008 Visser et al. ................ 704/227

* cited by examiner

*Primary Examiner*—Tan Trinh
(74) *Attorney, Agent, or Firm*—Steven A Nielsen; Allman & Nielsen

(57) ABSTRACT

The present invention provides a voice coder for voice communication that employs a multi-microphone system as part of an improved approach to enhancing signal quality and improving the signal to noise ratio for such voice communications, where there is a special relationship between the position of a first microphone and a second microphone to provide the communication device with certain advantageous physical and acoustic properties. In addition, the communication device can have certain physical characteristics, and design features. In a two microphone arrangement, the first microphone is located in a location directed toward the speech source, while the second microphone is located in a location that provides a voice signal with significantly lower signal-to-noise ratio (SNR).

9 Claims, 7 Drawing Sheets

VOICE CODER WITH TWO MICROPHONE SYSTEM AND STRATEGIC MICROPHONE PLACEMENT TO DETER OBSTRUCTION FOR A DIGITAL COMMUNICATION DEVICE

RELATED APPLICATIONS

This application is related to and claims the benefit of priority under 35 U.S.C. §119 to U.S. Provisional Application Ser. No. 60/747,022 filed May 11, 2006 and entitled Voice Coder with Two Microphone System for a Digital Communication Device by Alon Konchitsky, the contents of which application are hereby incorporated by reference.

This application is related to and cross-references U.S. Application Ser. No. 60/805,226 filed Jun. 20, 2006 and entitled Noise Reduction System and Method Suitable for Hands Free Communication Devices by Alon Konchitsky, the contents of which application are hereby incorporated by reference.

BACKGROUND

1. Field of the Invention

The invention relates generally to communication devices that accept or receive voice input and more specifically to handheld telephone communication devices, which include but are not limited to, PDAs (personal digital assistants) that include or provide voice communication or processing capabilities, notebook and laptop or other information appliances that provide voice communication capabilities, as well as to wired telephones, cordless telephones or cellular/wireless/mobile telephones and voice over Internet protocol (VOIP) telephones where a voice coder is used, and to other information appliances and communications devices where a voice coder is used.

2. Background of the Invention

The use of wireless or wired communications devices, cell phones, and VOIP devices has become widespread. In any phone communication system, signal quality is important. Many alternative approaches have been taken in an attempt to enhance signal quality and voice signal to background noise ratio. These attempts have resulted in some improvements but have not been entirely successful, especially in environments where the background or ambient noise is substantial. These conventional attempts have also largely been focused on digital signal processing (DSP) techniques applied within the device itself, such as for a non-limiting example, within a base-band processor of a cellular telephone. It may also be appreciated that at least some of these attempted digital signal processing based solutions carry with them increased phone complexity and cost as well as increased power consumption and correspondingly lower battery life and talk time.

These conventional attempts to increase voice to background signal-to-noise ratio ("SNR") have also primarily been based on signal microphone devices with post-processing of the microphone input signal containing both spoken voice components and background noise components to extract the voice components or to emphasize or boost the voice components relative to the background noise. Little or no attention has been given to the problems and possible solutions that may be based upon the fundamental acoustic environment associated with use of handheld cellular telephones or other communication device.

Because signal quality is a significant concern in any voice communication system, there therefore remains a need for system, device, and method for enhancing signal quality, reducing or eliminating background noise and for increasing the overall voice to background signal-to-noise ratio. Advantageously such an approach would work in conjunction with existing digital signal processing based noise reduction and voice signal enhancement techniques.

SUMMARY

The present invention overcomes shortfalls in the conventional art of background noise reduction and voice to background SNR improvement in communication devices by providing a voice coder for voice communication that employs a multi-microphone system as part of an improved approach to enhancing signal quality and improving the SNR for such voice communications, where there is a special relationship between the positions of a first microphone and a second microphone to provide the communication device with certain advantageous physical and acoustic properties. In addition, the communication device can have certain physical characteristics, and design features. In a two microphone arrangement, the first microphone can be located in a location directed toward the speech source; while the second microphone can be located in a location that provides a voice signal with significantly lower SNR.

In one aspect of the invention, the invention is not limited to communication devices with more than two microphones utilized for noise reduction and cancellation purposes.

In another aspect of the invention, the communication device can be a handheld phone communication device, which can be, for a non-limiting example, a cellular or mobile phone or other handheld phone device or apparatus that includes or provides the capabilities of a phone device. It may also adopt VoIP technologies. Implementations and embodiments of the invention are not restricted to any particular arrangements for other aspects of the devices.

The invention is also applicable for non-voice applications where it may be advantageous to increase the signal to noise ratio of a particular signal type, even where that signal type is not voice, and even where a voice coder is not employed. These and other aspects of the present invention will become apparent upon reading the following detailed description in conjunction with the associated drawings.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Figure 1:
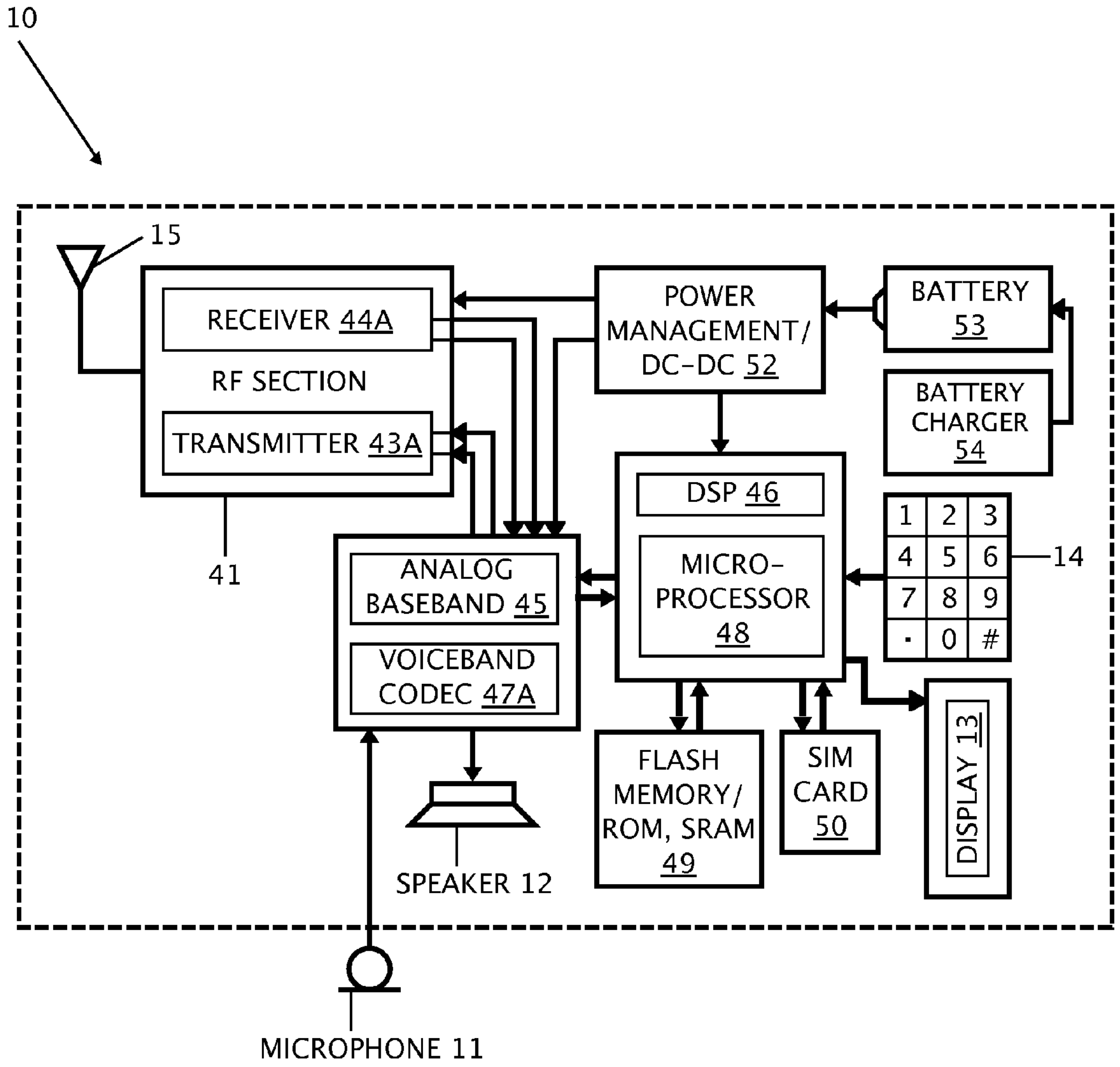
FIG. 1 is a block diagram showing an exemplary configuration of a conventional a wireless communication device incorporating only one microphone.

FIG. 1 illustrates a block diagram typical of the major functional blocks of an exemplary wireless communication device 10, where the voice coder in it is of the conventional type receiving only a single microphone input (that may include one signal or a pair of signals or wires) from microphone 11 and not having the inventive two microphones and two sets of microphone inputs to improve the voice quality and voice to background signal-to-noise ratio of the invention. This typical conventional device architecture is described so that the manner in which the invention interoperates with and improves the performance may be better understood.

Referring to FIG. 1, the device comprises only one (a first) microphone 11, a speaker or other sound reproducing transducer 12, a display screen 13, a keypad 14, an antenna 15, and a housing having an outer surface (not shown). Those skilled in the art will appreciate that speaker 12 could be replaced by an ear piece, head-set, or other electrical signal to acoustic transducer (not shown) that is worn by the cellular telephone user in the conventional manner. Speaker 12 is used herein to mean the device by which sound (such as in the form of an acoustic pressure wave) generated from a digital or electrical signal generated within the cellular phone or other device is transferred or reproduced) to the user. Also, display screen 13 could be a touch screen display, which might incorporate keypad 14 as interfaces between a user and the internal components and operational features of the telephone. Various other different interfaces may be utilized as are known in the art so that the particular interfaces and not limited only to those illustrated for typical telephone devices.

A radio-Frequency or RF section 41 is applicable to wireless communication devices (and not typically to wired or wire-lined communication devices) and includes a transmit section 43A and a receive section 44A, and is where the RF signal is filtered and down-converted to analog base-band signals for the receive signal. It is also where analog base band signals are filtered and then up-converted and amplified to RF for the transmit signal. Analog Base band 45 is where analog base band signals from RF receiver section 44A are filtered, sampled, and digitized before being fed to the Digital Signal Processing (DSP) section 46. It is also where coded speech digital information from the DSP section are sampled and converted to analog base band signals which are then fed to the RF transmitter section 43A. It will be understood that no radio-frequency (RF) section 41 or antenna 15 would be required for a wired or wired line implementation as described below.

A Voice Band Codec (Voice Coder or VoCoder) 47A is where voice speech from the microphone 11 is digitized and coded to a certain bit rate (for a non-limiting example, 13 kbps for GSM) using the appropriate coding scheme (balance between perceived quality of the compressed speech and the overall cellular system capacity and cost). It is also where the received voice call binary information are decoded and converted in the speaker or speakerphone 48.

A digital signal processor (DSP) 46 is typically a highly customized processor designed to perform signal-manipulation calculations at high speed. The microprocessor 48 handles all of the housekeeping chores for the keyboard and display, deals with command and control signaling with the base station and also coordinates the rest of the functions on the board.

ROM, SRAM, or Flash memory chips 49 provide storage for the phone's operating system and customizable features, such as the phone directory. The SIM card 50 belongs to this category and it stores the subscriber's identification number and other network information.

A power Management/DC-DC converter section 52 regulates from the battery 53 all the voltages required to the different phone sections. Battery charger 54 is responsible for charging the battery and maintaining it in a charged state. Portions of the Power Management and DC-DC converter section 52 and battery charger 54 may not be required when a device is not battery powered, or does not use rechargeable batteries.

Figure 2:
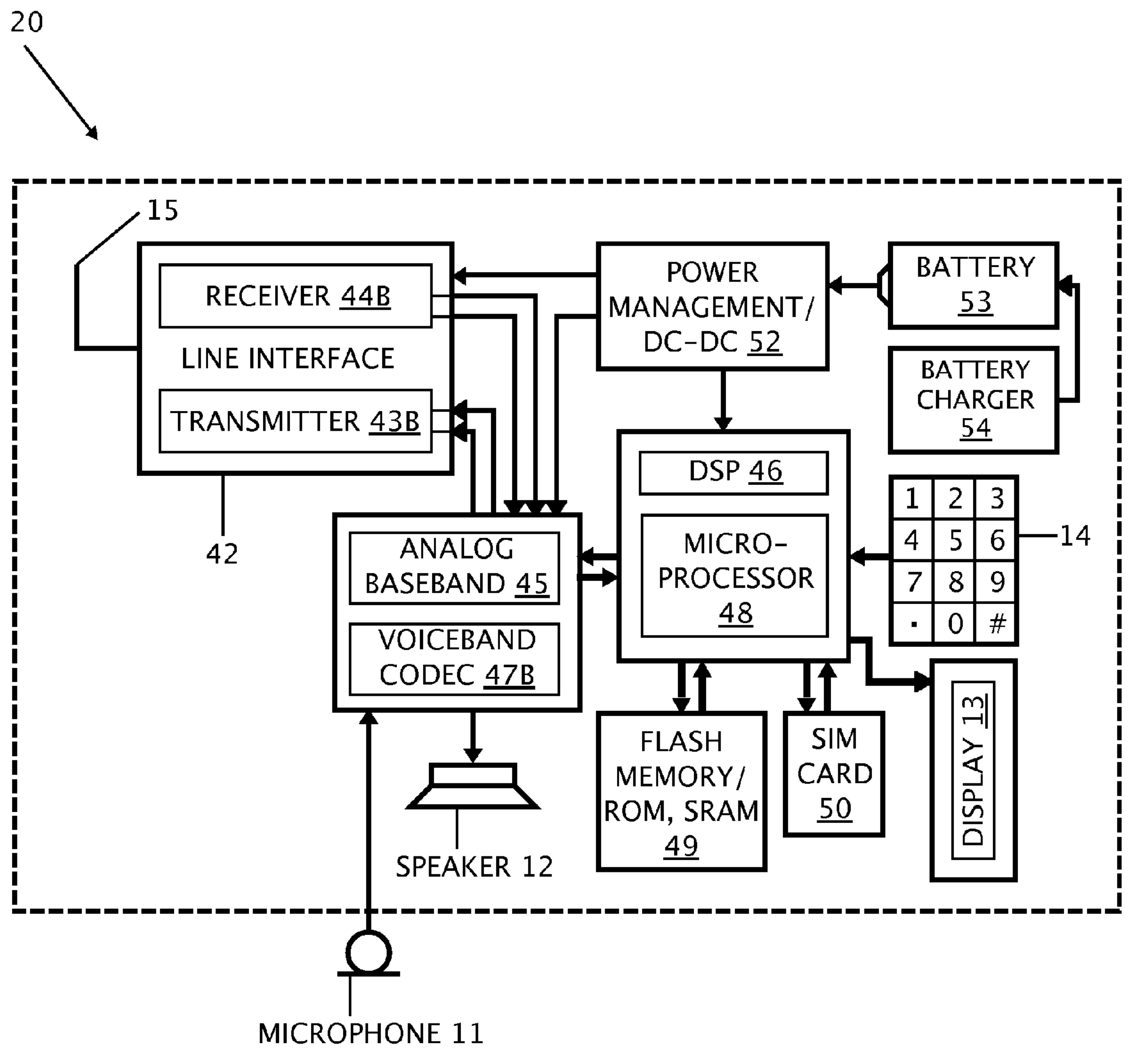
FIG. 2 is a block diagram showing an exemplary configuration of a conventional wired or wire-line communication device incorporating only one microphone.

FIG. 2 illustrates a block diagram typical of the major functional blocks of an exemplary wired or wire lined communication device 20, where the voice coder in it is of the conventional type receiving only a single conventional microphone input and not having the two microphones or two microphone inputs to improve the voice quality and voice signal to noise ratio as provided by the present invention. Again, this conventional device architecture is described so that the manner in which the invention interoperates with and improves over the performance of conventional devices and processing methods may be better understood.

The system in FIG. 2 differs from the system in FIG. 1 primarily in that if replaces the RF section 41 with a line interface section 42, and the antenna 15 with a wire or other communication path or structure (not shown). This conventional wired architecture comprises a first (and only) microphone 11, a speaker or other sound reproducing transducer 12, a display screen 13, a keypad 14, a wire or other communication path, which may for a non-limiting example be a telephone line wire or an internet connection, and a housing having an outer surface. Speaker 12 is used herein to mean the device by which sound (such as in the form of an acoustic pressure wave) generated from a digital or electrical signal generated within the cellular phone or other device is transferred or reproduced to the user. Those skilled in the art will appreciate that speaker 12 could be replaced by an ear piece, head-set, or other electrical signal to acoustic transducer (not shown) that is worn by the cellular telephone user in the conventional manner. Also, display screen 13 could be a touch screen display, which might incorporate keypad 14 as interface between a user and the internal components and operational features of the telephone. Various other different interfaces may be utilized as are known in the art so that the particular interfaces and not limited only to those illustrated for typical telephone devices.

Line interface section 42 includes a transmit section 43B and a receive section 44B and is where the wire line signal is filtered and down-converted to analog base band signals for the receive signal. It may be appreciated that the transmit section 43A and the receive section 44A of the RF wireless implementation may be different than the transmit section 43B and receive section 44B of the line-interfaced wired implementation. The line interface section is also where analog base band signals are filtered and then up-converted and amplified to wire lined frequencies and amplitudes for the transmit signal. Analog Base band 45 is where analog base band signals from line receiver section 44B are filtered, sampled, and digitized before being fed to the Digital Signal Processing (DSP) section 46. It is also where coded speech digital information from the DSP section are sampled and converted to analog base band signals which are then fed to the line transmitter section 43. It is understood that no line-interface section 42 would be required for the wireless embodiment, the corresponding structure in the wireless implementation being the RF section 41.

A Voice Band Codec 47B is where voice speech from the microphone 11 is digitized and coded to a certain bit rate (for a non-limiting example, about 32 to 64 kbps for messengers) using the appropriate coding scheme (balance between perceived quality of the compressed speech and the overall cellular system capacity and cost). It is also where the received voice call binary information are decoded and converted in the speaker or speakerphone 12.

Again, it will be appreciated in light of the description provided herein that the voice band coder 47A including the bit rates and coding schemes for the wireless implementation may differ from the voice band coder 47B including the bit rates and coding schemes for the wired implementation. However, these differences are details associated with the designs and implementations of the actual devices as understood by workers having ordinary skill in these arts and not described in further detail herein.

A digital signal processor (DSP) 46 is typically a highly customized processor designed to perform signal-manipulation calculations at high speed. The microprocessor 48 handles all of the housekeeping chores for the keyboard and display, deals with command and control signaling with the base station and also coordinates the rest of the functions on the board.

ROM, SRAM, and Flash memory chips 49 provide storage for the phone's operating system and customizable features, such as the phone directory. Although a SIM card 50 is illustrated in the wired embodiment of FIG. 2 in analogy with the wireless embodiment of FIG. 1, it may frequently not be provided in such wired implementations, though such implementations do not preclude it.

A power Management/DC-DC converter section 52 regulates from the battery 53 all the voltages required to the different phone sections. Battery charger 54 is responsible for charging the battery and maintaining it in a charged state. The battery charger 54 may not be provided in systems or devices that have a wired power supply or do not otherwise rely on a chargeable or rechargeable battery.

Figure 3:
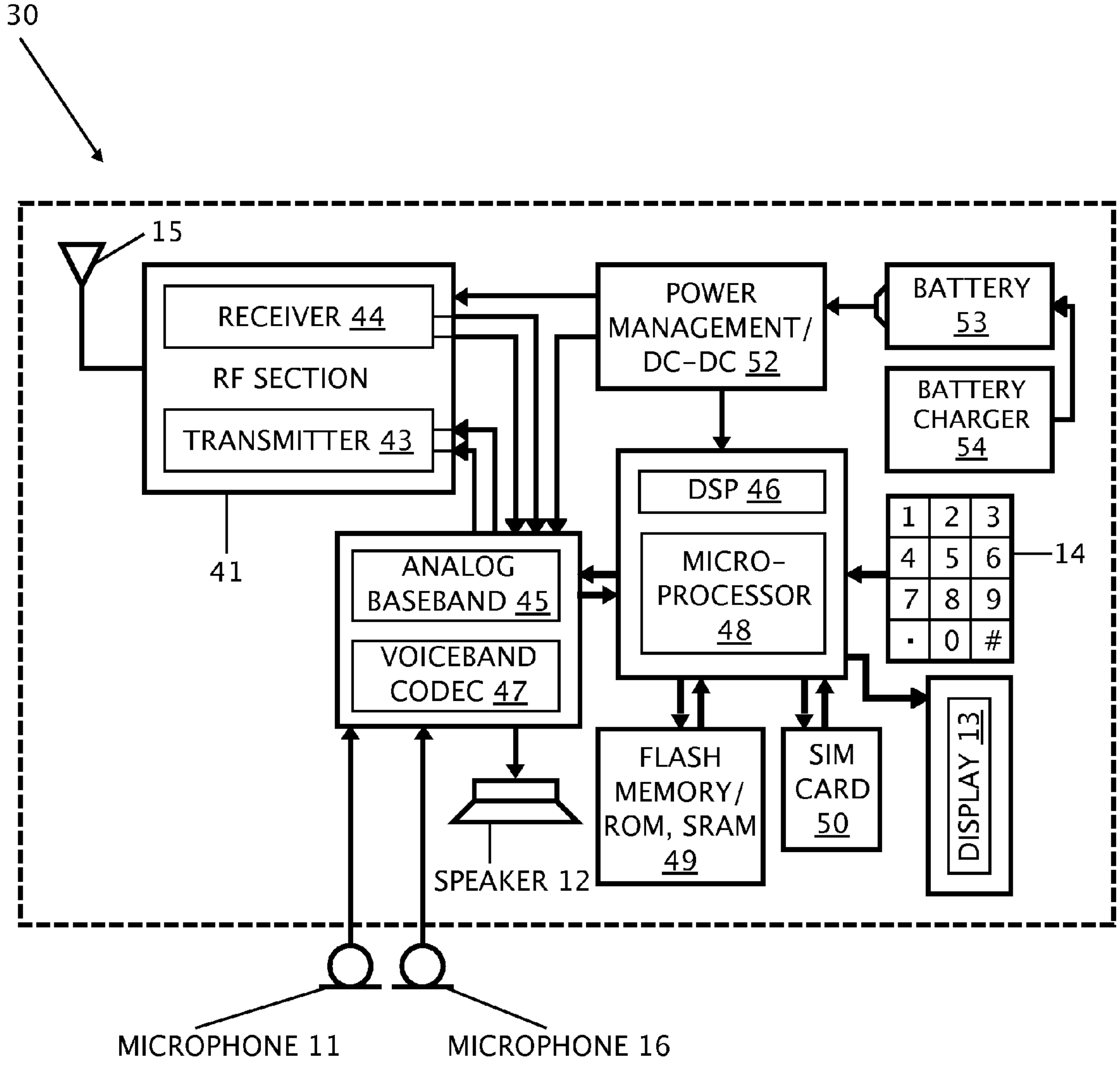
FIG. 3 is a block diagram of exemplary functional components of a wireless communication device incorporating at least two microphones in accordance with one embodiment of the present invention.

FIG. 3 illustrates a block diagram showing functional components of an exemplary wireless communication device 30 in which at least two microphones are provided in order to improve the voice quality and signal to noise ratio of the communication device in accordance with one embodiment of the present invention. A second microphone 16 generates a signal that inputs to the voice band codec 47 along with the signal input from the first microphone 11. The presence of the second microphone that is located to collect a smaller amplitude or lower power background signal, as compared to the first microphone that is located to collect a higher amplitude or higher power voice signal, permits a good measure of the background or ambient noise so that the noise may be reduced or entirely cancelled and the voice to background noise signal to noise ratio increased as compared to a single microphone system.

Figure 4:
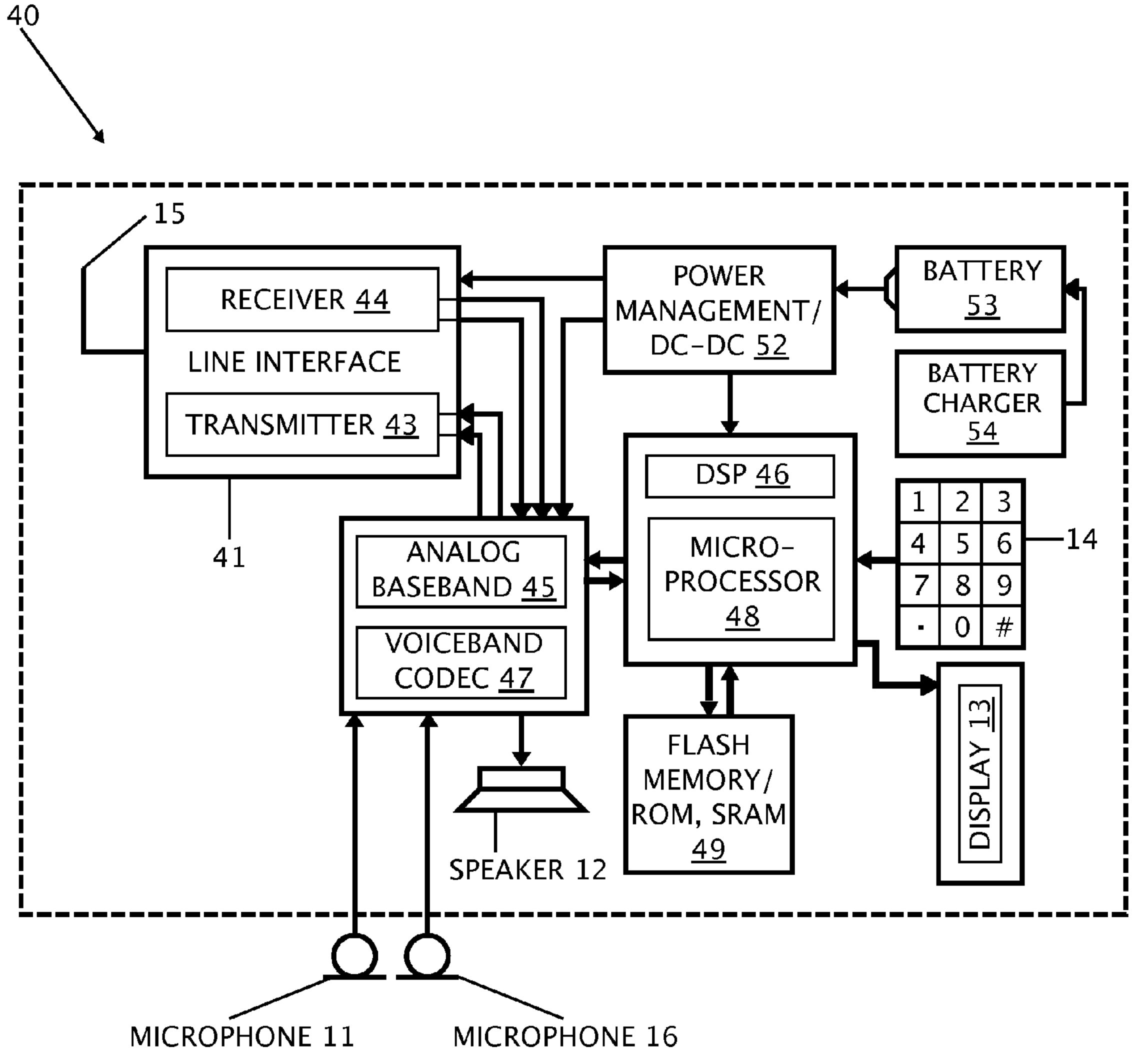
FIG. 4 is a block diagram of exemplary functional components of a wired or wire-line communication device incorporating at least two microphones in accordance with one embodiment of the present invention.

FIG. 4 illustrates a block diagram showing an exemplary wired communication device 40 in which two microphones are provided in order to improve the voice quality and signal to noise ratio of the communication device in accordance with one embodiment of the present invention. A second microphone 16 generates a signal that is input to the voice band codec 47 along with the signal input from the first microphone 11 just as for the embodiment of FIG. 3. Again, the presence of the second microphone that is located to collect a smaller amplitude or lower power background signal as compared to the voice signal that is located to collect a higher amplitude or higher power voice signal, permits a good measure of the background or ambient noise so that the noise may be reduced or entirely cancelled and the voice to background noise signal to noise ration increased as compared to a single microphone system.

Figure 5A:
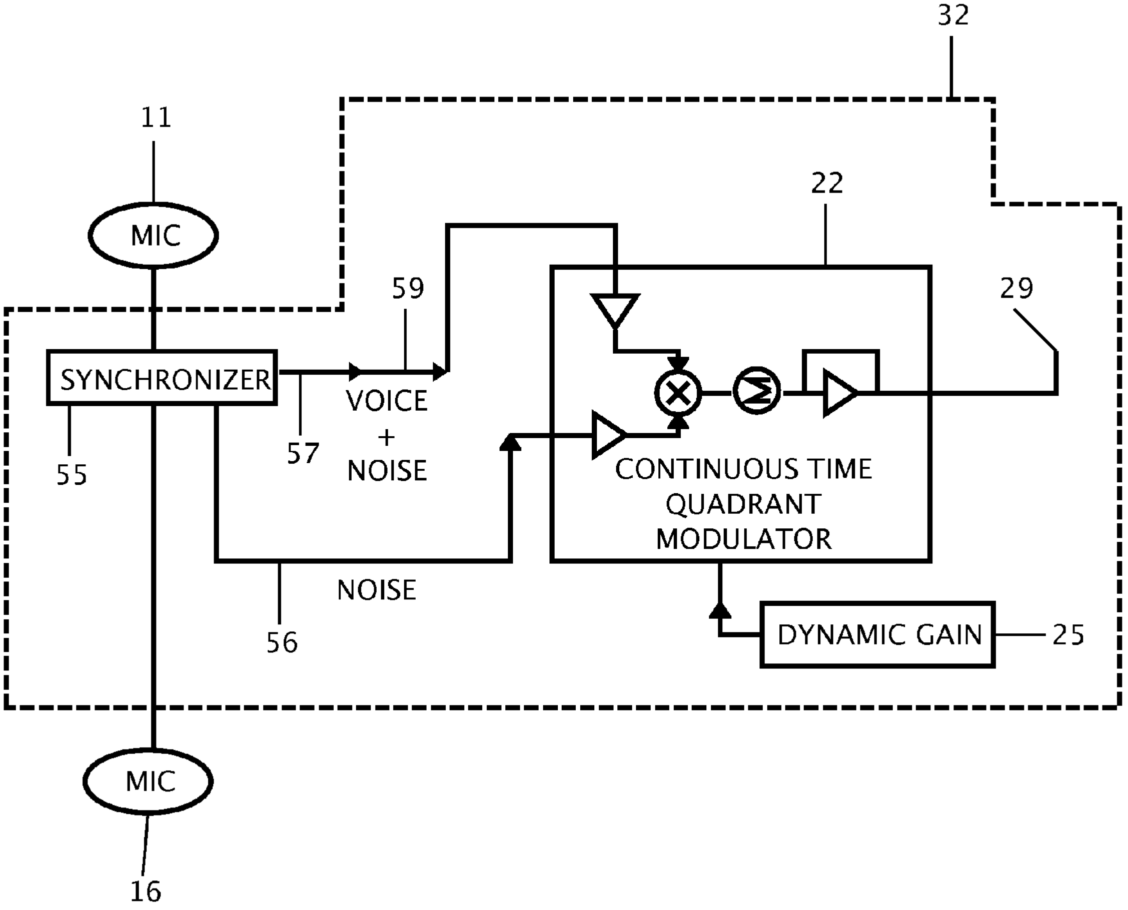
FIGS. 5(*a*)-(*c*) are exemplary diagrams of circuits for noise reduction associated with the voice band codec in accordance with one embodiment of the present invention.
Figure 5B:
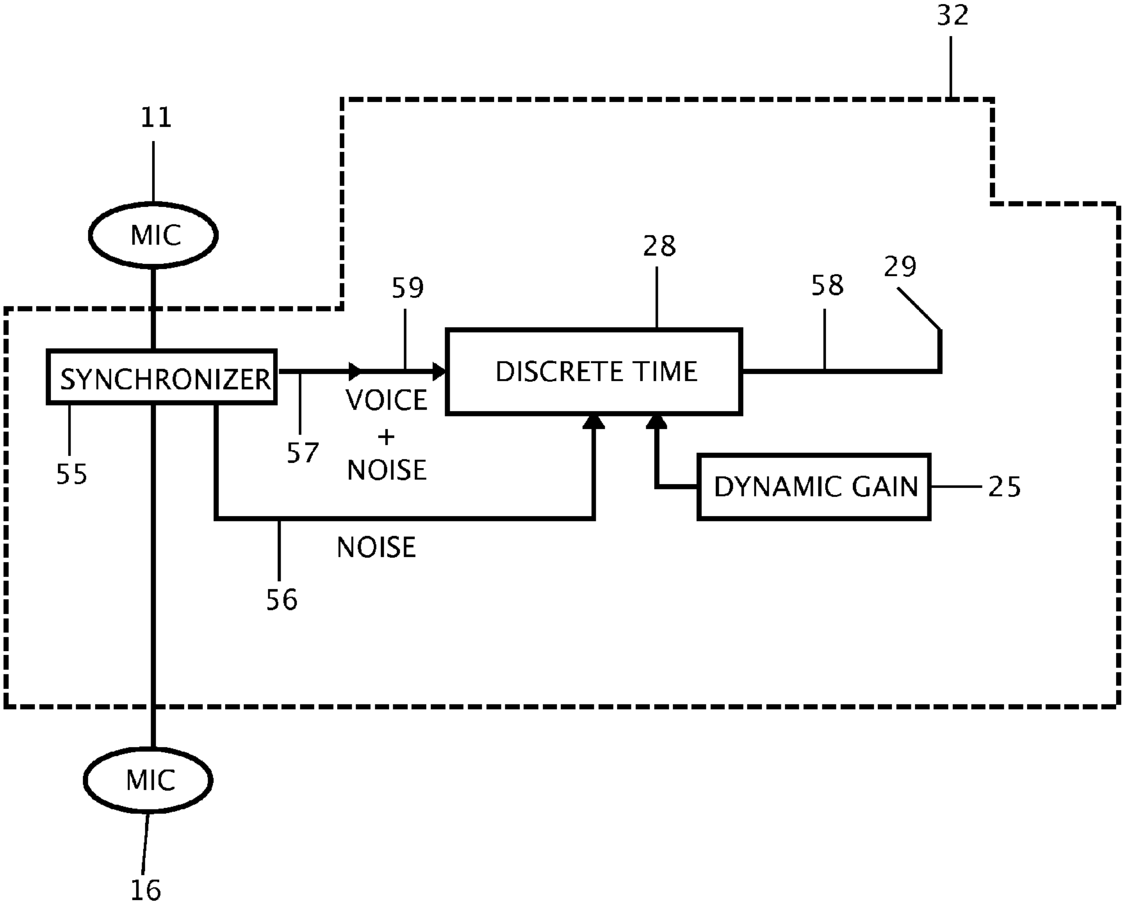
Figure 5C:
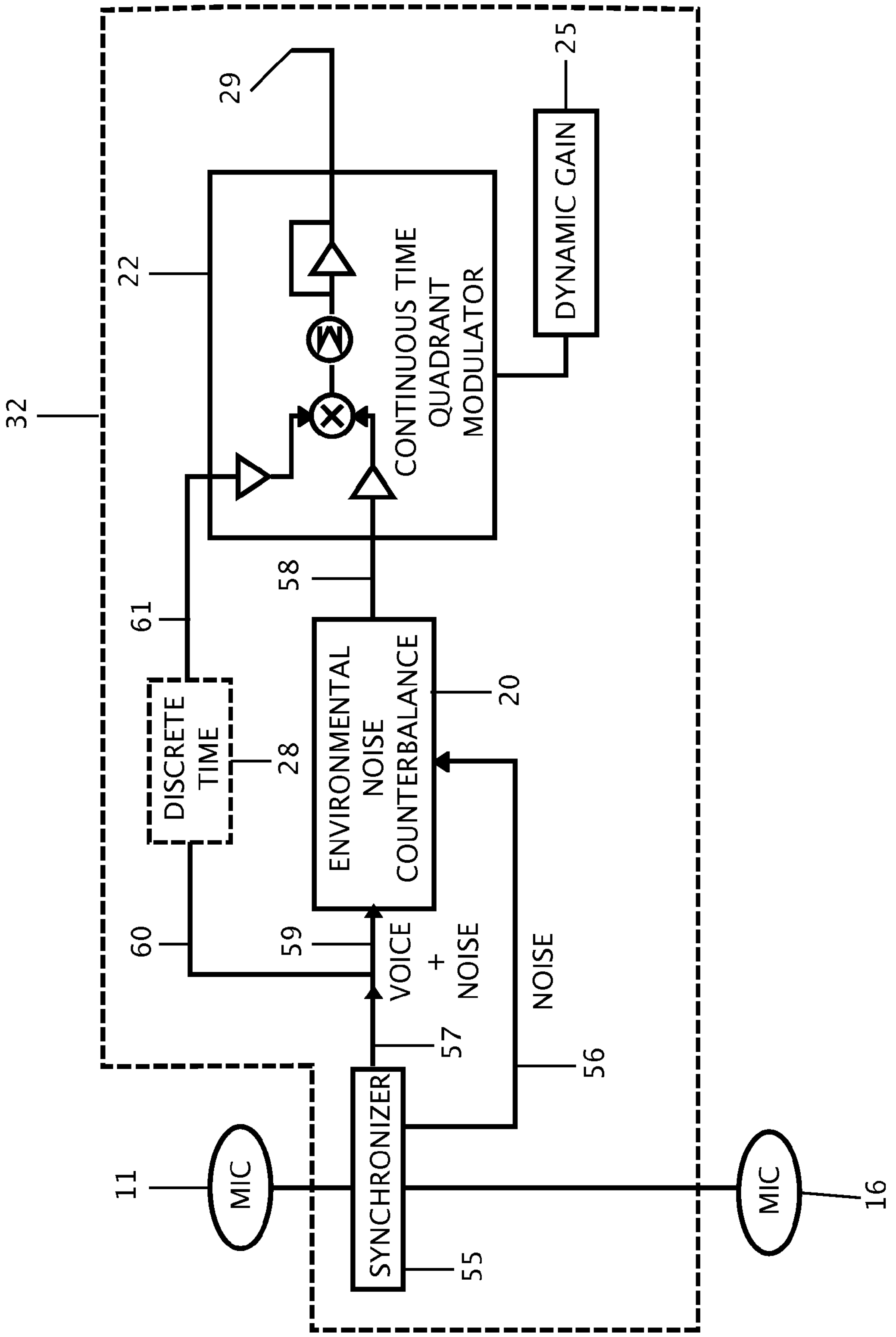

FIGS. 5(*a*)-(*c*) illustrate exemplary diagrams of noise reduction component 32 associated the voice band codec 47, wherein the noise reduction component 32 utilizes both microphone inputs 11 and 16 to achieve noise reduction before it feeds the noise reduced signal 29 to the voce band codec. In some embodiments, a synchronizer circuit or processing block 55 is needed to synchronize the inputs from first microphone 11 and second microphone 16 when there is a delay that is not otherwise compensated for. The input of the first microphone 11 may be processed by a wireless headset before being transmitted to the communication device and is thus likely delayed as compared to the input from the second microphone 16 which travels directly to the synchronizer.

In some embodiments, the synchronizer circuit synchronizes the signals by at least one of a time synchronization, a phase synchronization, and a combination of a time and phase synchronization. When synchronizing the signals in time or phase, at least one of the signals is delayed so that the background signal component collected by the first microphone is substantially synchronized to the background signal component of the second microphone.

In some embodiments, the signal from the second microphone 16 travels though connection 56, while the signal from microphone 11 travels through connections 57 and 59, to either the continuous time quadrant modulator circuit (processing block) 22 shown in FIG. 5(*a*) for analog signal processing or alternatively to a discrete time unit (processor) 28 shown in FIG. 5(*b*) for digital signal processing after synchronization. Various techniques for adding and subtracting or otherwise combining the signal (noise) collected by microphone 16 from the signal (voice plus noise) collected by microphone 11 are known in the art, such as the use of operational amplifiers, differential amplifiers, comparators, and the like analog/digital circuits, may be utilized here. The result is that the environmental noise or background noise is eliminated or cancelled, or at least substantially reduced.

In some embodiments, the signals from microphones 11 and 16 may travel through first and second connections 57 and 59 into an environmental noise counterbalance circuit 20 after synchronization, and signal from the microphone 11 may alternatively travel through connections 57 and 60 into the discrete time circuit 28, before they travel through connection 58 and 61 respectively into the continuous time quadrant modulator circuit 22 as shown in FIG. 5(*c*). The environmental noise counterbalance circuit 20, in accordance with well-known techniques, generates one or more counterbalanced signal(s) that are operable to attenuate or altogether cancel background or environmental noise that is not intended or desirable to be transmitted to another party. These counterbalanced signals are fed into continuous time quadrant modulator circuit 22 where these signals are mixed or combined with the composite signal of environmental noise plus voice from microphone 11. The discrete time unit 28 may be optionally utilized here to slow or controllably delay the progress or propagation of the composite signal emanating from the output of the microphone 11 so that when it reaches the continuous time quadrant multiplication block 22, the arrival time of the composite signal and the counterbalanced signal(s) generated by environmental noise reduction and or cancellation generator is/are synchronized.

In some embodiments, a dynamic gain circuit 25 may optionally but advantageously be applied to the continuous time quadrant modulator 22 or the discrete time unit 28 to alter the gain or weight applied to at least one of the signals from the first and the second microphone. In some instances, the noise reduced signal 29 (environmental noise plus voice signal) will have a noise reduction that is sufficiently great that the signal 29 will appear to the listener to be noise free or substantially noise free.

Embodiments of systems, devices, and methods for making and operating communication devices of the types described here using two microphones, including a first microphone primarily for collecting a voice input (with some ambient background noise) and a second microphone primarily intended to collect ambient background (but also generally collecting some of the speaker's voice) are also described in co-pending U.S. Patent Application Nos.: 60/747,022 filed May 11, 2006 and entitled Voice Coder with Two Microphone System for a Digital Communication Device; 60/805,266 filed Jun. 20, 2006 and entitled Noise Reduction System and Method Suitable for Hands Free Communication each of which applications are hereby incorporated by reference. Any of the techniques described in the above referenced patent applications for two-microphone or plural microphone noise reduction and/or cancellation may be applied to the present invention, including sensing from first and second microphones and from two tube configurations that develop a composite single mechanical to electrical microphone signal from acoustic wave cancellation.

In some embodiments, a plurality of microphones, not just two, are provided with at least one microphone being primarily for the sensing and transducing of a speaker's voice and at least one microphone being primarily for sensing and transducing background or ambient sounds or noise other than the speaker's voice.

In some embodiments, a plurality of secondary microphones may be provided for selective single use and/or simultaneous plural use to sense background noises for noise reduction or cancellation. Circuitry and/or logic can be associated with the plurality of secondary microphones to determine the most effective secondary microphone from a plurality of provided second microphones to use for noise reduction or cancellation given a possible obstruction or distortion situation of other of the plurality of secondary microphones. Either the best of the available secondary microphones may be used or the processing applied when using one or more of the secondary microphones may be modified to compensate for partial obstruction, distortion, or a combination of the two. A determination may optionally be made that the second microphone was so obstructed that the noise compensation using the secondary microphone should be disabled.

In some embodiments, the noise cancellation and reduction can also be improved or optimized by optimally placing at least one secondary microphone (and in some embodiments a plurality of secondary microphones) to primarily collect clear and undistorted background sound. Such well chosen microphone locations provide a secondary microphone signal with significantly smaller voice to background signal to noise ratio than the for the first microphone signal, yet with the signal at the secondary microphone being not overly obstructed to preserve the relationship of the signals. Having a lower voice signal to background SNR is advantageous because it permits the background signal to be more readily identified so that the background signal may be compensated for or cancelled from the first microphone signal, thereby resulting in a higher voice to background SNR.

It will be appreciated in light of the description provided herein (as well as by way of the non-limiting examples provided in the other related patent applications incorporated by reference herein) that the physical location or positioning of the microphone on or within the device, any direction of the microphone as a result of the surface of the device on which the microphone aperture is exposed on the surface of the housing of the device, any directionality characteristics that arise from the microphone diaphragm or other microphone internal mechanical, electrical, electrostatic or other effect may have an effect on the noise reduction performance. In addition, the user may physically obstruct the second microphone such as by pressing a finger or part of the hand or even a part of the head or face over the microphone aperture, or the user may not actually press against it so much as alter or obstruct the flow of acoustic waves to and into the microphone to cause a distortion. If significant, this distortion or actual obstruction of the second microphone may result in less effective background noise reduction of cancellation relative to the voice signal because the intent is to use the background signal to cancel out components of the voice plus background signal from the first microphone. If the background signal component from the first microphone is significantly different in character (amplitude variations are not significant and may readily be compensated for by additional amplification or attenuation of one of the two signals as appropriate) then the background signal component from the first microphone may not be a readily or completely removed. Furthermore, distortions may be introduced.

It is also noted that known distortions are unavoidable even in the absence of user handling problems may be accounted for in the design of the microphone input signal processing circuits, either in the amplitude domain, time domain, frequency domain, or in some combination of these domains, Either the first microphone signal or the second microphone signal or each of the first and second microphone signals may be processed in some way, for a non-limiting example, by filtering, to compensate for or trim the two sets of microphone signals to make them more or less neutral or to match some other desired conditions for typical user operation. In this way if the user handles, holds, and otherwise handles the device in a normal or typical manner, then the background component from the second microphone can provide a good calibration signal for canceling out the background noise from the first microphone input carrying primarily the important voice signal.

In some embodiments, the first microphone 11 is located at a traditional microphone location and has conventional microphone electrical output signal or signals that couple with circuits or logic into the voice coder, while a second microphone is located at a location different from the first microphone. The location of the first microphone is typically selected by the designer and manufacturer of the device to provide good collection of direct spoken voice so that the voice acoustic pressure waves are directed toward the first microphone aperture.

In some embodiments, the first microphone 11 appears roughly where the single microphone is placed in a typical communication device such as a wireless or wired phone, wireless cellular or mobile telephone, cordless phone, VoIP device, voice recording device, or the like. However, the second microphone 16 needs to provide a signal with significantly lower signal-to-noise ratio.

In some embodiments, the second microphone 16 is located at an effective physical and acoustic location to minimize the possibility of user obstruction and/or signal relationship distortion relative to the primary microphone. More specifically, the second microphone is advantageously positioned so as to avoid obstruction by a normal user of the device, especially when the device is relatively small and the normal holding of the device may obstruct the microphone or negatively effect is performance. There may be multiple possible alternative positions that meet this requirement, and the possibilities may vary from device to device and may for a non-limiting example depend on device size and shape, the user's hand size, and the user's grip during phone use.

In some embodiments, several alternative exemplary locations for the second microphone 16 can be identified as providing the desired low voice-to-background SNR (i.e. a clean and clear background signal with only a low amplitude or low power voice signal component). As non-limiting examples, the second microphone can be located immediately adjacent to the antenna of the communication device, it can also be located on the headset or associated with the device or on an accessory of the device, where the proximity of the accessory to the second microphone makes it difficult for the user to cover the second microphone when holding the device. Alternatively, the second microphone can be located immediately adjacent to the speaker of the device.

In some embodiments, the housing of the communication device in the area of the second microphone includes a tactile sensible area that may assist in passively informing the user that he/she may be tending to obstruct the second microphone or introducing distortions relative to the first microphone and thereby rendering the noise reduction less effective. For a non-limiting example, a surface texture different from other areas of the phone or other device is provided. Alternatively, the area can be tacitly different but also raised above or depressed into the housing so that a user can feel the area during use without looking at it.

In each of the illustrated embodiments, the second microphone 16 is so placed that it is not so readily covered or obstructed by a user in typical use during a voice conversation or call. The desirable locations for the second microphone advantageously also takes into account the position of the hand against the phone or other device when holding the phone during use as well as the position of the phone against the head and face of the user during a conversation or when otherwise using a voice receptive device.

In some embodiments, the location of the second microphone is advantageously located sufficiently distant from the first microphone to provide a significantly lower voice SNR than the first microphone (which is at the traditional location) than the voice to background SNR of the first microphone, yet with the received acoustic wave signals (and the consequent generated electrical signals) being not overly obstructed or distorted so that the relationship between the two signals is preserved. A lower voice to background SNR is desired for the second microphone so that it can be used to reduce or cancel background noise from the first microphone signal and thereby result in achieving a higher voice to background SNR overall for the intended voice communication.

In some embodiments, the desirable locations of the second microphone also advantageously attempt to minimize the second microphone's exposure to direct input of acoustic pressure wave from the speaker's voice. For a non-limiting example, one would not position the second microphone immediately adjacent to the first microphone as that would result in each microphone receiving identical or substantially identical signals and compensation and cancellation of background noise using such a signal pair would be ineffective. It will be appreciated that the second microphone is expected to sense some of the voice signal but need not do so. What is advantageous for useful background or ambient noise reduction or cancellation is to provide a signal or set of signals such that that background signal when processed with the first microphone signal or set of signal can be processed out. The above referenced related applications describe exemplary embodiments of processing methods, system, and devices for combining primarily voice microphone signals with primarily background or ambient noise signals to achieve reduced noise levels and higher spoken voice to background signal to noise ratio. On the other hand, the present invention is not limited only to those processing techniques.

In some embodiments, the communication device can include a sensor (not shown) that determines if the second microphone might be obstructed or has a likelihood of creating a significant distortion. For non-limiting examples, the sensor can be an optical emitter and optical detector pair, such as a light emitting emitter and photo-diode detector. Transmission and/or scattering may differ when a body part such as a finger or and is near or covers over the sensor and the microphone. Optionally but advantageously, the user may receive an alarm, indication, text message, or advantageously an artificial voice message to move their hand or finger from the microphone.

In some embodiments, an electrical, capacitive, and/or pressure sensor (not shown) can be placed in the region of the second microphone. The sensor can detect one or more of moisture, conductivity, pressure, and other change in electrical or mechanical characteristic associated with the presence of a human body part or skin by using at least one or more of metallic strips, resistive material, semi-conductive material, or any other material or pattern. As in the above described optical sensor, the user may receive an alarm, indication, text message, or advantageously an artificial voice message to move their hand or finger from the second microphone.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A system to support background noise reduction in a communication device, comprising:

a first microphone located at a first location and operable to collect primarily a user's voice signal;

a second microphone located at a second location and operable to collect a primarily background signal other than the user's voice signal; and a voice coder operable to:

receive signals from both the first microphone and the second microphone; and generate an enhanced signal with reduced noise and improved signal-to-noise ratio (SNR);

a noise reduction component associated with the voice coder operable to compensate or remove background noise from the first microphone signal using the background noise signal from the second microphone;

the noise reduction component further comprises:

a synchronizer circuit operable to synchronize the signals from the first microphone and the second microphone when there is a delay that is not otherwise compensated for;

a continuous time quadrant modulation circuit operable to reduce background noise by subtracting the primarily background noise signal from the second microphone from the background noise component of the composite signal from the first microphone via analog signal processing;

a discrete time circuit operable to perform:

slowing or controllably delaying the progress or propagation of the signal from the first microphone;

reducing background noise by subtracting the signal from the second microphone from the background noise component of the composite signal from the first microphone via digital signal processing.

2. A system according to claim 1, wherein the first location is so selected that the first microphone receives a substantially direct acoustic pressure wave from the user during speech; wherein the second location is sufficiently distant from the first location to provide a lower voice to background noise ratio than the voice to background noise signal-to-noise ratio provided by the first microphone; wherein the second location is so selected that normal holding of the communication device by the user does not overly obstruct the reception at the second microphone: wherein the second location is selected to minimize the second microphone's exposure to direct input of acoustic pressure wave from the user.

3. A system according to claim 2, wherein the second location is in a tactile sensible area of the communication device.

4. A system according to claim 1, wherein the noise reduction component further comprises:

a dynamic gain circuit operable to alter the gain or weight applied to at least one of the signals from the first and the second microphones, or to a signal derived from the first microphone or the second microphone and an environmental noise counterbalance circuit operable to generate one or more counterbalanced signals that are operable to attenuate or altogether cancel background or environmental noise that is not intended or desirable to be transmitted to another party.

5. A method to support background noise reduction in a communication device, comprising:

collecting primarily a user's voice signal via a first microphone;

collecting a primarily background signal other than the user's voice signal via a second microphone;

compensating or removing background ambient noise from the first microphone signal using the background noise signal from the second microphone; and generating an enhanced signal with reduced noise and improved signal-to-noise ratio (SNR) synchronizing the signals from the first microphone and the second microphone when there is a delay that is not otherwise compensated for;

reducing background noise by subtracting the primarily background noise signal from the second microphone from the background noise component of the composite signal from the first microphone via analog or digital signal processing;

slowing or controllably delaying the progress or propagation of the signal from the first microphone:

altering the gain or weight applied to at least one of the signals from the first and the second microphones, or to a signal derived from the first microphone or the second microphone; and generating one or more counterbalanced signals that are operable to attenuate or altogether cancel background or environmental noise that is not intended or desirable to be transmitted to another party.

6. The method of claim 5, further comprising one or more of:

positioning the first microphone to receive a substantially direct acoustic pressure wave from the user during speech;

positioning the second microphone to minimize the second microphone's exposure to direct input of acoustic pressure wave from the user; and positioning the second microphone to be sufficiently distant from the first microphone to provide a lower voice to background noise ratio than the voice to background noise signal-to-noise ratio provided by the first microphone.

7. The method of claim 5, further comprising one or more of:

determining if the second microphone might be obstructed or has a likelihood of creating a significant distortion;

detecting one or more of moisture, conductivity, pressure, and other change in electrical or mechanical characteristic associated with the presence of a human body part near the second microphone;

collecting background noise by selective single use and/or simultaneous plural use of a plurality of secondary microphones;

providing the enhanced signal to a speaker and/or speaker phone;

positioning at least one of the plurality of secondary microphones to collect clear and undistorted background sound; and determining the most effective microphone to use for noise reduction or cancellation given a possible obstruction or distortion situation of one or more of the plurality of secondary microphones.

8. A system to support background noise reduction in a communication device, comprising:

means for collecting primarily a user's voice signal via a first microphone;

means for collecting a primarily background signal other than the user's voice signal via a second microphone;

means for compensating or removing background ambient noise from the first microphone signal using the background noise signal from the second microphone; and means for generating an enhanced signal with reduced noise and improved signal-to-noise ratio (SNR) by use of a voice coder operable to:

accept and process signals from a plurality of microphones using appropriate coding scheme;

compensate or remove background noise from one of the plurality of microphones signals using the background noise from rest of the plurality of microphone signals;

generate an enhanced signal with reduced noise and improved signal-to-noise ratio (SNR): and provide the enhanced signal to a speaker and/or speaker phone;

wherein at least one of the plurality of microphones is primarily for the sensing and transducing of a user's voice and at least one of the plurality of microphones is primarily for sensing and transducing background or ambient sounds or noise other than the user's voice: a noise reduction component associated with the voice coder operable to compensate or remove background noise from the first microphone signal using the background noise signal from the second microphone:

the noise reduction component further comprises:

a synchronizer circuit operable to synchronize the signals from the first microphone and the second microphone when there is a delay that is not otherwise compensated for;

a continuous time quadrant modulation circuit operable to reduce background noise by subtracting the primarily background noise signal from the second microphone from the background noise component of the composite signal from the first microphone via analog signal processing;

a discrete time circuit operable to perform:

slowing or controllably delaying the progress or propagation of the signal from the first microphone: and reducing background noise by subtracting the signal from the second microphone from the background noise component of the composite signal from the first microphone via digital signal processing.

9. A system to support background noise reduction in a communication device, comprising:

a voice coder operable to:

accept and process signals from a plurality of microphones using appropriate coding scheme;

compensate or remove background noise from one of the plurality of microphones signals using the background noise from rest of the plurality of microphone signals;

generate an enhanced signal with reduced noise and improved signal-to-noise ratio (SNR); and provide the enhanced signal to a speaker and/or speaker phone;

wherein at least one of the plurality of microphones is primarily for the sensing and transducing of a user's voice and at least one of the plurality of microphones is primarily for sensing and transducing background or ambient sounds or noise other than the user's voice; a noise reduction component associated with the voice coder operable to compensate or remove background noise from the first microphone signal using the background noise signal from the second microphone:

the noise reduction component further comprises:

a synchronizer circuit operable to synchronize the signals from the first microphone and the second microphone when there is a delay that is not otherwise compensated for:

a continuous time quadrant modulation circuit operable to reduce background noise by subtracting the primarily background noise signal from the second microphone from the background noise component of the composite signal from the first microphone via analog signal processing;

a discrete time circuit operable to perform:

slowing or controllably delaying the progress or propagation of the signal from the first microphone: and reducing background noise by subtracting the signal from the second microphone from the background noise component of the composite signal from the first microphone via digital signal processing.

* * * * *